(12) United States Patent
Lee (10) Patent No.: US 9,549,130 B2
(45) Date of Patent: Jan. 17, 2017

(54) COMPACT ROW COLUMN NOISE FILTER FOR AN IMAGING SYSTEM

(71) Applicant: Seek Thermal, Inc., Goleta, CA (US)

(72) Inventor: Jeffery Lee, Goleta, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 0 days.

(21) Appl. No.: 14/702,548

(22) Filed: May 1, 2015

(65) Prior Publication Data

US 2016/0323525 A1 Nov. 3, 2016

(51) Int. Cl.

| | |
|---|---|
| H01L 25/00 | (2006.01) |
| H04N 5/357 | (2011.01) |
| G06T 5/20 | (2006.01) |
| G06T 5/40 | (2006.01) |
| H04N 5/33 | (2006.01) |
| H04N 5/378 | (2011.01) |
| H04N 5/341 | (2011.01) |
| H04N 5/232 | (2006.01) |

(52) U.S. Cl.
CPC .......... *H04N 5/357* (2013.01); *G06T 5/20* (2013.01); *G06T 5/40* (2013.01); *H04N 5/23293* (2013.01); *H04N 5/332* (2013.01); *H04N 5/341* (2013.01); *H04N 5/378* (2013.01)

(58) Field of Classification Search
CPC .......... G06T 5/002; G06T 7/20; G01S 3/7864; G06K 9/40; H04S 5/365; H04S 5/33; G01J 5/00
See application file for complete search history.

(56) References Cited

U.S. PATENT DOCUMENTS

| | | |
|---|---|---|
| 5,200,623 A | 4/1993 | Cannata |
| 6,252,995 B1 | 6/2001 | Takamori |
| 6,730,909 B2 | 5/2004 | Butler |
| 6,757,442 B1 * | 6/2004 | Avinash .................. G06T 5/004 382/168 |
| 7,795,578 B2 | 9/2010 | Högasten et al. |
| 7,796,168 B1 | 9/2010 | Kostrzewa et al. |

(Continued)

FOREIGN PATENT DOCUMENTS

| | | |
|---|---|---|
| EP | 1 083 740 | 3/2001 |
| EP | 1 601 185 | 11/2005 |

(Continued)

OTHER PUBLICATIONS

PCT International Search Report and Written Opinion for PCT/US2015/032671 mailed Sep. 7, 2015 in 16 pages.

(Continued)

*Primary Examiner* — Kiho Kim
(74) *Attorney, Agent, or Firm* — Knobbe Martens Olson & Bear LLP (57) ABSTRACT

In some embodiments, methods or systems may be provided for an imaging system including an imaging sensor, wherein frames or sub-frames of intensity data may be acquired from some or all pixels of the frame, and a moving kernel, smaller than the frame or sub-frame, is moved over the frame for analysis. The values of the center column of the kernel may be compared to the outer column values of the kernel and a column offset for the center column may be determined. Only one offset value may be stored at any one time for each pixel in the frame or sub-frame.

20 Claims, 6 Drawing Sheets

(56) References Cited

U.S. PATENT DOCUMENTS

| | | | |
|---|---|---|---|
| 7,982,652 B2 | 7/2011 | Simony et al. |
| 7,995,859 B2 | 8/2011 | Högasten |
| 8,189,050 B1 | 5/2012 | Hughes et al. |
| 8,208,026 B2 | 6/2012 | Högasten et al. |
| 8,208,755 B1 | 6/2012 | Högasten |
| 8,306,275 B2 | 11/2012 | Högasten |
| 8,340,414 B2 | 12/2012 | Högasten et al. |
| 8,373,757 B1 | 2/2013 | Nguyen |
| 8,378,290 B1 | 2/2013 | Speake et al. |
| 8,428,385 B2 | 4/2013 | Whiteside et al. |
| 8,737,760 B2 | 5/2014 | Olsson et al. |
| 8,780,208 B2 | 7/2014 | Högasten et al. |
| 9,332,186 B2 | 5/2016 | Johansson et al. |
| 9,335,352 B2 | 5/2016 | McCrea et al. |
| 2002/0022938 A1 | 2/2002 | Butler |
| 2002/0074499 A1 | 6/2002 | Butler |
| 2006/0092297 A1 | 5/2006 | Lee et al. |
| 2006/0193509 A1* | 8/2006 | Criminisi ........... G06K 9/00241 382/154 |
| 2007/0147698 A1* | 6/2007 | Reid ................ G06T 5/004 382/263 |
| 2009/0073278 A1 | 3/2009 | Ogawa et al. |
| 2010/0141768 A1 | 6/2010 | Liberman et al. |
| 2010/0238294 A1 | 9/2010 | Högasten et al. |
| 2011/0141368 A1 | 6/2011 | Wallace et al. |
| 2013/0064449 A1 | 3/2013 | Menikoff |
| 2013/0147966 A1 | 6/2013 | Kostrzewa et al. |
| 2013/0169819 A1 | 7/2013 | Strandemar |
| 2013/0222604 A1 | 8/2013 | Ingerhed et al. |
| 2013/0300875 A1 | 11/2013 | Strandemar et al. |
| 2014/0015921 A1 | 1/2014 | Foi et al. |
| 2014/0016879 A1 | 1/2014 | Högasten et al. |
| 2014/0037225 A1 | 2/2014 | Högasten et al. |
| 2014/0092257 A1 | 4/2014 | Högasten et al. |
| 2014/0092258 A1 | 4/2014 | Dart et al. |
| 2014/0168445 A1 | 6/2014 | Högasten et al. |
| 2014/0247365 A1 | 9/2014 | Gardner et al. |
| 2014/0313343 A1 | 10/2014 | Frank et al. |
| 2014/0313385 A1 | 10/2014 | Sato et al. |
| 2014/0355902 A1 | 12/2014 | Olsson |
| 2014/0355904 A1 | 12/2014 | Olsson |
| 2015/0187144 A1 | 7/2015 | Roth |
| 2015/0310594 A1 | 10/2015 | Olsson |
| 2015/0312488 A1 | 10/2015 | Kostrzewa et al. |
| 2015/0312489 A1 | 10/2015 | Hoelter et al. |
| 2015/0319379 A1 | 11/2015 | Nussmeier et al. |
| 2015/0350567 A1 | 12/2015 | Parrish et al. |
| 2016/0041039 A1 | 2/2016 | Olsson |
| 2016/0042500 A1 | 2/2016 | Engberg et al. |
| 2016/0044306 A1 | 2/2016 | Chahine et al. |
| 2016/0056785 A1 | 2/2016 | Wolfe et al. |
| 2016/0057369 A1 | 2/2016 | Wolfe et al. |
| 2016/0203694 A1 | 7/2016 | Högasten et al. |

FOREIGN PATENT DOCUMENTS

| | | |
|---|---|---|
| EP | 1667 066 | 6/2006 |
| EP | 2 618 560 | 7/2013 |
| EP | 2 645 577 | 10/2013 |
| WO | WO 2013/084809 | 6/2013 |
| WO | WO 2013/191611 | 12/2013 |
| WO | WO 2014/106210 | 7/2014 |

OTHER PUBLICATIONS

PCT International Search Report and Written Opinion for PCT/US042826 mailed Oct. 16, 2015 in 12 pages.

PCT International Search Report and Written Opinion for PCT/US043547 mailed Oct. 9, 2015 in 11 pages.

PCT International Search Report and Written Opinion for PCT/US045656 mailed Oct. 21, 2015 in 12 pages.

Badamchizadeh, et al., Image and Graphics, Comparative Study of Unsharp Masking Methods for Image Enhancement, 2004, pp. 27-30.

PCT International Search Report and Written Opinion for PCT/US2015/063111 mailed May 17, 2016 in 13 pages.

* cited by examiner

COMPACT ROW COLUMN NOISE FILTER FOR AN IMAGING SYSTEM

BACKGROUND

Field

The present disclosure generally relates to systems and methods for image adjustments for imaging systems such as cameras including infrared cameras for thermal imaging systems, and in particular to systems and methods for adjusting for row column noise in a manner that is efficient both computationally and with respect to memory usage.

Description of Related Art

The increasing availability of high-performance, low-cost uncooled infrared imaging devices, such as bolometer focal plane arrays, is enabling the design and production of mass-produced, consumer-oriented infrared cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. New approaches to image processing including noise filtering may be desirable for lower-cost, mass-produced systems.

SUMMARY

Example embodiments described herein have innovative features, no single one of which is indispensable or solely responsible for their desirable attributes. Without limiting the scope of the claims, some of the advantageous features will now be summarized.

In some embodiments, methods or systems may be provided for an imaging system including an imaging sensor, wherein frames or sub-frames of intensity data may be acquired from some or all pixels of the frame, and a moving kernel, smaller than the frame or sub-frame, is moved over the frame for analysis. The values of the center column of the kernel may be compared to the outer column values of the kernel and a column offset for the center column may be determined. Only one offset value may be stored at any one time for each pixel in the frame or sub-frame.

In a first aspect, a method may be provided for adjusting an image derived from data acquired by a two-dimensional image sensor (e.g., a sensor comprising an array of pixels arranged in columns and rows). The method includes acquiring an image frame from the image sensor, the image frame comprising a two-dimensional array of pixel values with individual pixel values representing image intensity data. The method includes determining a pixel offset mask comprising an array of offset values, wherein an individual offset value of the pixel offset mask corresponds to an individual pixel in the image frame. Determining the pixel offset mask includes selecting a kernel of image data from the image frame, wherein the kernel is a two-dimensional array of pixels smaller than the image frame, the kernel including at least 3 columns and having an odd number of columns so that the kernel comprises a center column and outer columns, the center column positioned between the outer columns. Determining the pixel offset mask further includes a) determining a column average for individual columns in the kernel equal to an average value of the pixels in the respective column of the kernel; b) calculating an outer column average for the kernel equal to an average value of the column averages for the outer columns; c) generating a current offset value for individual pixels in the center column of the kernel, the current offset value equal to a difference between the outer column average and the column average of the center column; d) if an individual pixel has a previous offset value stored in the offset mask, setting the offset value equal to a weighted sum of the current offset value and the previous offset value, and if the individual pixel does not have a previous offset value stored in the offset mask, setting the offset value equal to the current offset value; and e) storing the offset value in a corresponding location of the offset mask. Determining the pixel offset mask further includes moving the kernel by at least one pixel in at least one direction and repeating the steps a)-e) for the new location of the kernel. The method includes subtracting the pixel offset mask from the corresponding pixel values of the image frame to adjust for column variations in the image intensity data.

In some embodiments of the first aspect, the method determines median values in place of average values.

In some embodiments of the first aspect, the kernel comprises 3 columns and 5 rows (e.g., an array of 3×5 pixels). In some embodiments, the kernel comprises 5 columns and 5 rows (e.g., an array of 5×5 pixels). In some embodiments, the method can be performed using rows in place of columns.

In some embodiments of the first aspect, setting an offset value for a pixel, $O_p$, equal to a weighted sum of a current offset value, $O_{pt}$, and a previous offset value, $O_{pt-1}$, comprises using the following equation:

$$O_p = \frac{1}{K}O_{pt} + \frac{K-1}{K}O_{pt-1}$$

In a further embodiment of the first aspect, the number K is 8. In a further embodiment, the number K is 16.

In some embodiments of the first aspect, the method further includes setting the offset value for a pixel to zero if the calculated offset value is outside an offset value threshold.

In some embodiments of the first aspect, the image sensor is an infrared focal plane array.

In a second aspect, a method may be provided for adjusting an image derived from a two-dimensional image sensor with an array of pixels having X columns and Y rows. The method includes acquiring an image frame, P, comprising a two-dimensional array of pixel values, $P_{x,y}$, wherein the image frame includes M columns and N rows such that M≤X and N≤Y, (e.g., the image frame comprises pixel values $P_{x,y}$ where x=0 . . . M−1 and y=0 . . . N−1). The method includes determining a pixel offset mask, O, comprising offset values, $O_{x,y}$, for pixels in the image frame, P. Determining the pixel offset mask includes selecting a kernel of image data of m×n pixels from the image frame starting at a pixel P where a∈[0 . . . M−1] and b∈[0 . . . N−1]

where m=2j+1 for non-zero positive integer j. Determining the pixel offset mask, O, further includes a) determining column averages for each column of the kernel, $C_1$, $C_2$, . . . $C_m$:

$$C_1 = (P_{a,b} + P_{a,b+1} + \ldots + P_{a,b+n-1})/n$$

$$C_2 = (P_{a+1,b} + P_{a+1,b+1} + \ldots + P_{a+1,b+n-1})/n$$

. . .

$$C_m = (P_{a+m-1,y} + P_{a+m-1,y+1} + \ldots + P_{a+m-1,y+n-1})/n$$

b) determining an outer column average, $C_{outer}$, for the kernel (where $C_{center}$ is equal to $C_{(m+1)/2}$):

$$C_{outer} = \left[\left(\sum_{i=1}^{m} C_i\right) - C_{center}\right] / (m-1)$$

c) generating a current offset value, $O_{pt}$, for the pixels in the center column of the kernel:

$$O_{pt} = C_{center} - C_{outer}$$

d) determining an offset value, $O_{(a+m-1)/2,b}$, for each pixel in the center column:

$$O_{\frac{a+m-1}{2},b} = O_{pt}$$
$$O_{\frac{a+m-1}{2},b+1} = O_{pt}$$
$$\ldots$$
$$O_{\frac{a+m-1}{2},b+n-1} = O_{pt}$$

if $O_{pt}$ has not been defined in a previous iteration; else $$O_{\frac{a+m-1}{2},b} = \frac{1}{K}O_{pt} + \frac{K-1}{K}O'_{\frac{a+m-1}{2},b}$$
$$O_{\frac{a+m-1}{2},b+1} = \frac{1}{K}O_{pt} + \frac{K-1}{K}O'_{\frac{a+m-1}{2},b+1}$$
$$\ldots$$
$$O_{\frac{a+m-1}{2},b+n-1} = \frac{1}{K}O_{pt} + \frac{K-1}{K}O'_{\frac{a+m-1}{2},b+n-1}$$

where $O'_{(a+m-1)/2,b}$ is a previously stored offset value for the corresponding pixel; and e) storing the offset values in the offset mask, O. Determining the offset mask, O, further includes moving the kernel by at least one pixel in at least one direction (e.g., $P_{a,b} \rightarrow P_{a+1,b}$) and repeating steps a) to e) for each kernel location. The method includes moving the kernel until the image frame or a region of interest within the image frame has been analyzed to determine the offset mask, O, for the image frame or the region of interest. The method includes determining an adjusted image, r, where the pixel values of the adjusted image, are equal to:

$$I'_{x,y} = P_{x,y} - O_{x,y}.$$

The method thus only stores one offset mask value for each pixel at any time, thereby adjusting the image in a manner that is computationally efficient.

In some embodiments of the second aspect, median values can be calculated or determined in place of average values.

In some embodiments of the second aspect, m is 3 and n is 5. In some embodiments of the second aspect, m is 5 and n is 5.

In some embodiments of the second aspect, K is 8. In some embodiments, K is 16.

In some embodiments of the second aspect, the method further includes determining if an offset value computed for any kernel position is outside a predetermined threshold, and setting the corresponding offset values to zero.

In some embodiments of the second aspect, the image sensor may be an infrared focal plane array.

In a third aspect, an imaging system is provided that includes a camera or thermal sensor and an image processing system, the camera having a focal plane array. The image processing system is configured to adjust pixel values from the focal plane array using a pixel offset mask determined using the methods disclosed herein. The image processing system is configured to determine the pixel offset mask such that a single value for a pixel offset is stored in data storage for each pixel at any particular time during image processing.

In some embodiments of the third aspect, the camera is housed in a separate housing from the image processing system. In a further embodiment, the camera is electronically coupled to the image processing system through an electronic connector. In yet another further embodiment, the connector comprises a lightning connector, micro-USB connector, or other connector configured to transmit digital data between the camera and the image processing system. In a further embodiment, the camera further includes pre-processing electronics configured to process pixel data from the image sensor and transmit the pre-processed pixel data to the image processing system.

In some embodiments of the third aspect, the camera and the image processing system are contained in a single housing.

In some embodiments of the third aspect, the image processing system comprises a field programmable gate array configured to determine the pixel offset mask. In some embodiments of the third aspect, the image processing system comprises an application-specific integrated circuit configured to determine the pixel offset mask.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to adjusting image data to reduce row or column noise in an imaging system. The present disclosure includes systems and methods configured to determine offsets for pixels caused at least in part by row or column noise. The systems and methods systematically process portions of an image to determine individual offsets for respective pixels. For each pixel, no more than one value for the offset is stored in memory at any given time during the analysis. This allows an imaging system to correct images for row or column noise variations to be performed in a computationally efficient manner, where computationally efficient can be used to refer to an efficient use of memory and/or an efficient use of processor cycles.

Although the examples and implementations described herein focus, for the purpose of illustration, on focal plane arrays in thermal imaging systems, one skilled in the art will appreciate that the techniques described herein may be applied to other processes, methods, or systems. For example, the techniques may be used with other types of imaging systems that may suffer from row or column noise effects due at least in part to row-based or column-based readout electronics. For example, the disclosed systems and methods may be used in a variety of imaging systems, including visible imaging systems such as digital cameras and video cameras. Various aspects of the disclosure will now be described with regard to certain examples and embodiments, which are intended to illustrate but not limit the disclosure.

Example Imaging Systems

Figure 1A:
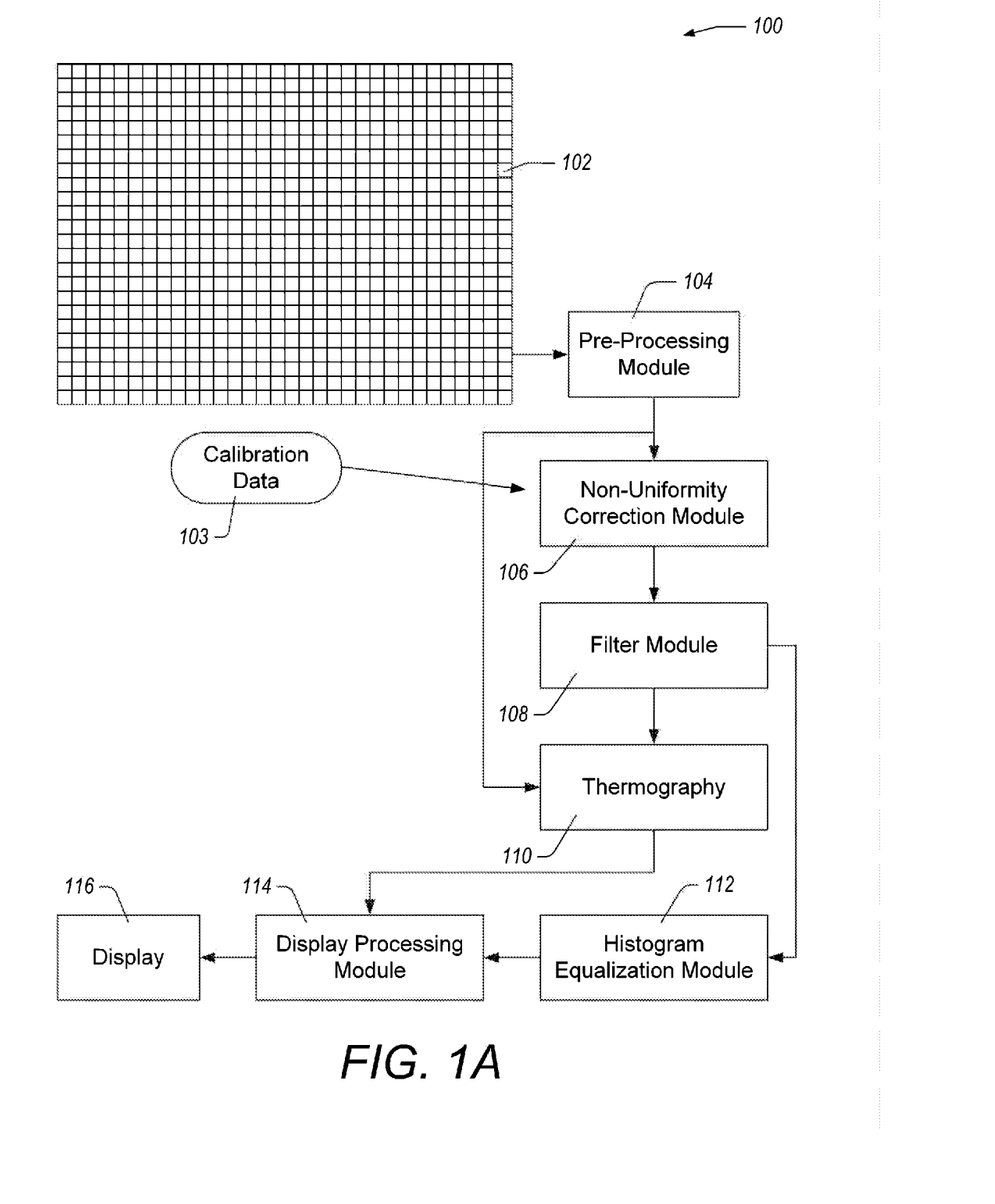
FIG. 1A illustrates a functional block diagram of an example imaging system.

FIG. 1A illustrates a functional block diagram of an imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit ("ROTC"). The array of microbolometers can be configured to generate electrical signals in response to a quantity of thermal radiation or a temperature. The ROTC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. Prov. App. No. 62/039,579, entitled "Gain Calibration for an Imaging System," filed Aug. 20, 2015, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments. The following modules are described to illustrate the breadth of functionality available to the disclosed imaging systems and not to indicate that any individual module or described functionality is required, critical, essential, or necessary.

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. Prov. App. No. 62/039,566, entitled "Adaptive Adjustment of the Operating Bias of an Imaging System," filed Aug. 20, 2014, the entire contents of which is incorporated by reference herein.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived by intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter. Additional examples of systems and methods for non-uniformity correction are provided in U.S. Prov. App. No. 62/033,374, entitled "Time Based Offset Correction for Imaging Systems," filed Aug. 5, 2014, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail herein with reference to FIGS. 2-5. Examples of systems and methods to correct for these artifacts are described in greater detail herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. Prov. App. No. 62/086,305, entitled "Image Adjustment Based on Locally Flat Scenes," filed Dec. 2, 2014, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace pixel data with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. Prov. App. No. 62/069,511, entitled "Local Contrast Adjustment for Digital Images," filed Oct. 28, 2014, and U.S. Prov. App. No. 62/033,364, entitled "Local Contrast Edge Enhancement for Digital Images," filed Aug. 5, 2014, the entire contents of each of which is incorporated by reference herein.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. Prov. App. No.

62/043,005, entitled "Image Display and Thermography for a Thermal Imaging Camera," filed Aug. 28, 2014, the entire contents of which is incorporated by reference herein.

The image processing system 100 includes a histogram equalization module 112, or other display conversion module, configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on portions of the image where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words. For instance, the sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. Prov. App. No. 62/049,880, entitled "Selective Color Display of a Thermal Image," filed Sep. 12, 2014, the entire contents of which is incorporated herein by reference in its entirety.

The display 116 can be configured display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
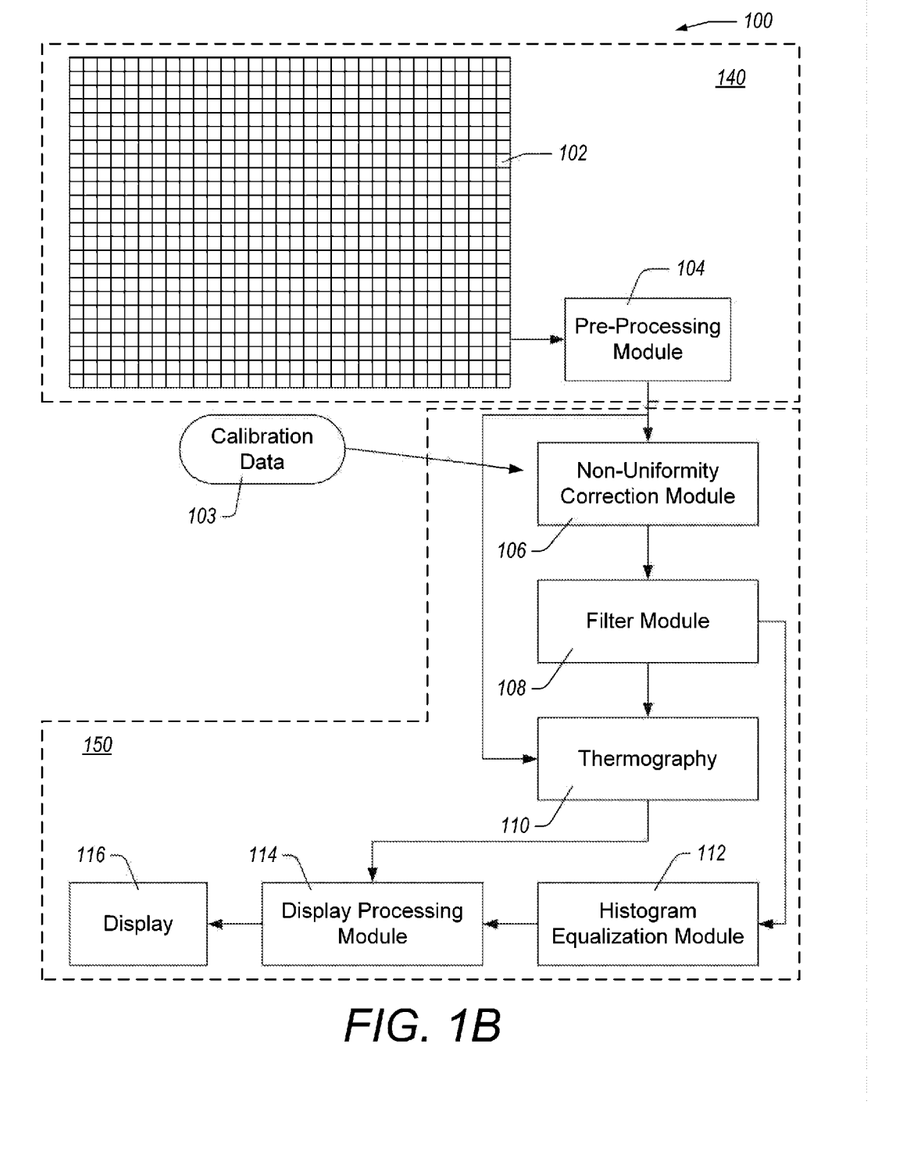
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and a mobile electronic device 150. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the mobile electronic device 150 can be included in the camera 140 instead of in the mobile electronic device 150. In some embodiments, certain advantages are realized based at least in part on the division of functions between the camera 140 and the mobile electronic device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the mobile electronic device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the mobile electronic device 150 (e.g., in the thermography module 110).

An output of the camera 140 can be a stream of digital data representing pixel values provided by the pre-processing module 104. The data can be transmitted to the mobile electronic device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The mobile electronic device 150 can be a smartphone, tablet, laptop, or other similar portable electronic device. In some embodiments, power is delivered to the camera 140 from the mobile electronic device 150 through the electrical connectors and/or cables.

The imaging system 100 can be configured to leverage the computing power, data storage, and/or battery power of the mobile electronic device 150 to provide image processing capabilities, power, image storage, and the like for the camera 140. By off-loading these functions from the camera 140 to the mobile electronic device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the mobile electronic device 150 to perform image processing, data storage, and the like.

Example Row/Column Noise Filters

As described herein, row/column noise filters can be implemented as part of an image processing or signal processing system in an imaging system. One or more embodiments of the disclosed row/column noise filters may be compact and/or efficient in terms of computational implementation and/or memory usage. One or more embodiments described herein may provide for a row/column noise filter that may be suitable for image processing where the filter is implemented in a Field Programmable Gate Array (FPGA) and/or application-specific integrated circuit (ASIC). One or more embodiments described herein may provide for filtering of row-dependent noise variations as well as column-dependent noise variations.

The row column noise filter systems and methods may be implemented using computer-executable instructions, using digital logic on hardware and software, and/or may be implemented using any of a variety of analog and/or digital discrete circuit components (transistors, resistors, capacitors, inductors, diodes, etc.), programmable logic components (e.g., field programmable gate arrays), microprocessors, microcontrollers, application-specific integrated circuits, or a combination of these and other circuit elements. An imaging system can include data storage configured to store computer executable instructions that are configured to operate in conjunction with discrete circuit components to carry out one or more of the processes described herein. In certain embodiments, the imaging system includes an imaging device (e.g., a focal plane array (FPA)) that is part of a camera core. In such embodiments, the imaging system comprises the camera core electrically or operably coupled to an electronic device, wherein processing, memory, and/or data storage components are part of the electronic device, the electronic device being a smart phone, tablet, personal computer, or the like. In some embodiments, the components providing processing, memory, and/or data storage may be implemented using programmable logic, FPGAs, or on-board processors that are part of the camera core, the electronic device, or both. In some embodiments, the imaging system comprises a unitary system, such as a thermal imager, thermal camera, or thermal sensor.

A focal plane array typically includes a two-dimensional array of pixels (e.g., P detectors arranged in X columns and Y rows, P=X*Y) that can provide a two-dimensional image of a scene. For imaging purposes, image frames can be provided by the focal plane array, where an image frame includes pixel data from all or some of the pixels of the focal plane array. Accordingly, a frame can have up to P pixels per frame. Similarly, a frame can be further divided into one or more sub-frames. Successive frames are generated by the focal plane array in successive time windows. Thus, a frame (or sub-frame) of data provided by the focal plane array includes a number digital words, each digital word representing a pixel value in the image. In some embodiments, these digital words can be the size of the analog to digital (A/D) converter. For example, if the pixel data is converted using a 14 bit A/D converter, the pixel words can be 14 bits in size. Consequently, each word can represent a pixel value in a range of 16384 (i.e., $2^{14}$) counts. For an infrared camera used as a thermal imaging system, these words may correspond to a map of intensity of radiation in a scene measured by pixels in the focal plane array. The intensity per pixel for a micro-bolometer infrared focal plane array, for example, can correspond to a temperature of a corresponding part of a scene, with lower values generally corresponding to colder regions and higher values generally corresponding to hotter regions. It may be desirable to display this image data on a visual display.

Each pixel in a focal plane array may include the radiation detector itself along with interface circuitry that can include resistor networks, transistors, and capacitors on a readout integrated circuit (ROIC) that may be integrated with the array of detectors in the focal plane array. The combination of the interface circuitry and the array of detectors, along with effects due to the system optics, may produce offset and/or temperature behaviors that may be large compared to the signals due to incident radiation on the detectors from a scene. Thus, it is often desirable to compensate for these effects, as described herein with reference to FIGS. 1A-1B. One artifact common in imaging sensors, such as focal plane arrays, is differences in noise levels between pixel columns and/or pixel rows of the sensor due at least in part to the readout integrated circuit.

Figure 2:
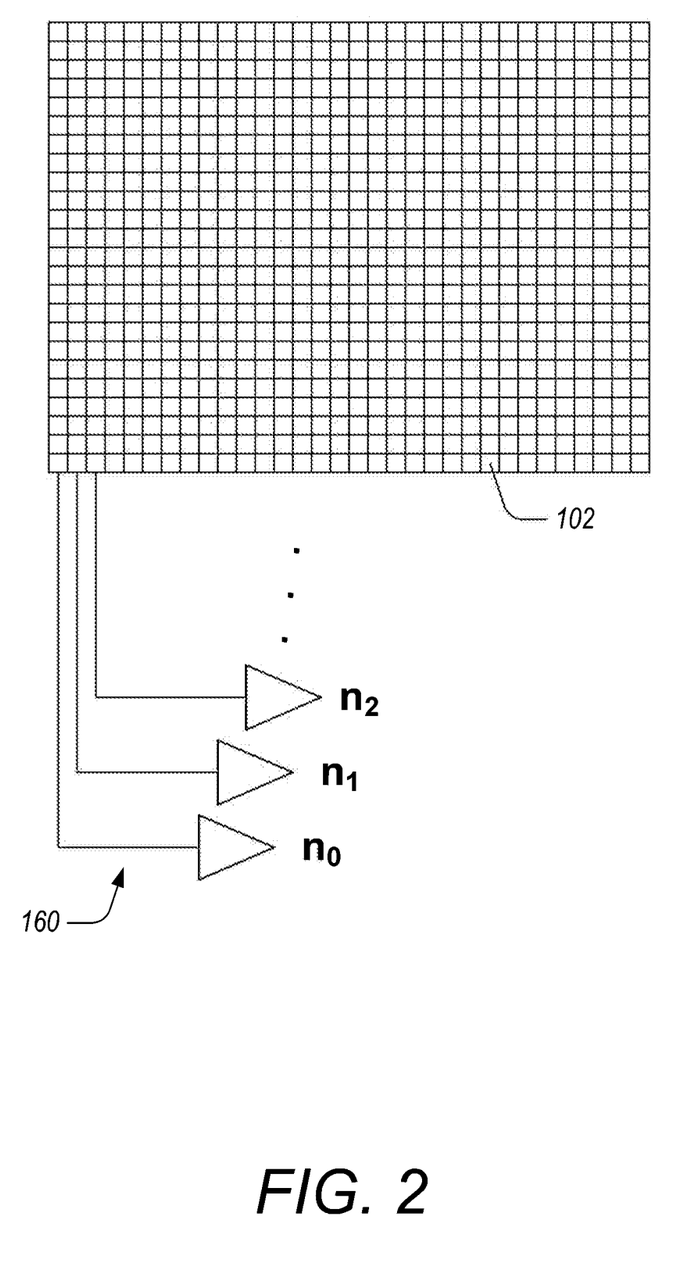
FIG. 2 illustrates an example of a portion of an image from an image sensor that has readout electronics with column noise variations.

FIG. 2 illustrates an example focal plane array 102. Interface circuitry is integrated with the focal plane array 102. The focal plane array 102 can be exposed to radiation for a period of time, and the focal plane array 102 can generate signals that are read out by the interface circuitry. In the illustrated focal plane array 102, the detector signals are read as serial data streams forming a frame of image data.

Although the interface circuitry performs a variety of functions such as buffering, integrating, analog-to-digital conversion, and the like, generally such functions are shared between groups of pixels in the array to keep the interface circuitry relatively simple. In other words, groups of pixels may be internally switched to various parts of the interface circuitry sequentially as each frame is processed and read out. A buffering and integration function 160 can be grouped by row or column as illustrated in FIG. 2. Rather than having an integration amplifier for each pixel, there may be one integration amplifier per column (or row). During the frame processing, each pixel in a column may be sequentially switched to the column integrator (or by row alternatively, or some combination thereof). Since each column integrator may be a separate circuit element in the interface circuitry, each column may have its own baseline noise, n0, n1, n2, . . . . In such imaging systems, this column- or row-dependent noise variation may be large enough to be visually noticeable compared to the image scene signals. Other noise sources may also contribute to row- or column-dependent noise. Thus, it may be advantageous to account for the row- or column-dependent noise in signal or image processing.

Typical row/column noise filters can be complex image processing algorithms that utilize data from multiple frames and that store a large amount of intermediate data. For low-cost imaging systems, which may have limited processing power and/or memory, it may be advantageous to perform row/column noise filtering with efficient computation and memory usage techniques.

Figure 3:
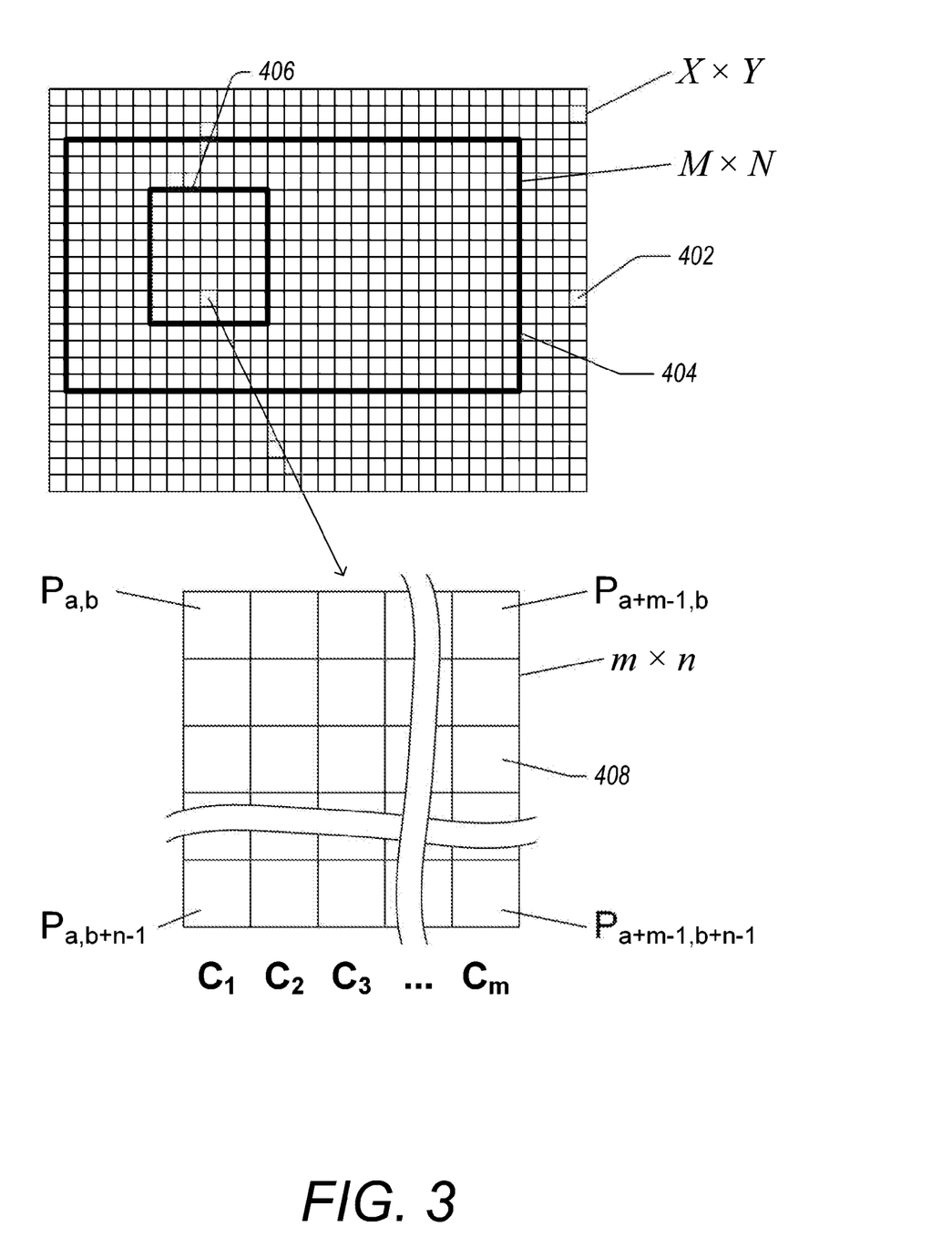
FIG. 3 illustrates dividing up an image and an image frame into a kernel to enable determination of column noise variations for pixels in the image.

FIG. 3 illustrates an array 402 of X by Y pixels. A row/column filter may be applied to all of the pixels of the array 402 or to a frame 404 of M by N pixels where M≤X and N≤Y, or alternatively to one or more sub-frames 406, defining a region or regions of interest. A frame 404 or one or more sub-frames 406 of pixel data is acquired. A kernel 408 can be defined within a respective frame 404 or sub-frame 406, the kernel 408 an array of m by n pixels, where m<M and n<N. The number m may be an odd number greater than or equal to 3. The disclosed kernel-based techniques for row-column noise filters can be utilized at edges of frames or sub-frames and can be utilized with frames or sub-frames that have an odd or even number of rows and/or columns by employing strategies generally used in other kernel-based techniques.

Kernel 408 may initially be placed at a given pixel, $P_{a,b}$, in the acquired frame 404 (or subframe(s) 406). The initial location, $P_{a,b}$, may be in a corner of the frame 404, but this is not required. In the illustrated example the kernel 408 is m pixels by n pixels. The kernel 408 may be displaced, usually by one pixel in either direction until the entire region of interest is covered and analyzed. A series of operations, disclosed below, can be performed at each kernel location and an offset mask, O, with Offset values, $O_{x,y}$, corresponding to each pixel, $P_{x,y}$, in the region of interest can be developed in a fashion that only stores one offset mask value per pixel at any given time.

With the kernel at the initial position, $P_{a,b}$, the average value of the pixels in each sub column, $C_1$ to $C_m$ is computed:

$$C_1 = (P_{a,b} + P_{a,b+1} + \ldots + P_{a,b+n-1})/n$$
$$C_2 = (P_{a+1,b} + P_{a+1,b+1} + \ldots + P_{a+1,b+n-1})/n$$
$$\ldots$$
$$C_m = (P_{a+m-1,y} + P_{a+m-1,y+1} + \ldots + P_{a+m-1,y+n-1})/n$$

With m odd, there will be a center column, $C_{(m+1)/2}$ and m−1 outer columns. The average of the m−1 outer columns is computed:

$$C_{outer} = \left[\left(\sum_{i=1}^{m} C_i\right) - \frac{C_{m+1}}{2}\right]/(m-1)$$

An offset value, $O_{pt}$, is computed:

$$O_{pt} = C_{(m+1)/2} - C_{outer}$$

This value is stored in a mask corresponding to all n of the kernel center column pixels. That is, the value $O_{pt}$ is assigned as the pixel offset value for each pixel in the center column. Although computing average values may be utilized in some embodiments, as described above, certain embodiments may compute median values. The intent is to smooth out individual pixel variations by grouping some number of pixels or columns, usually but not necessarily, greater than 2 but less than or equal to 10. Both computing averages and computing medians may have advantages. Using computed averages may smooth out variations, while using computed medians may tend to depress the effect of outliers, such as dead or noisy pixels. In the examples disclosed herein, averages, medians, or a combination of these may be employed. For example, for a 5 by 5 kernel the averages of each column of the kernel can be computed and the median can be calculated for the 4 outer columns. The offset can then be calculated as the difference between the median of the outer columns and the average of the center column.

The kernel 408 may be displaced by at least one pixel in at least one direction to proceed with the analysis. Once displaced, the process can be repeated for the new kernel location. Upon repeating the process, some offset mask values may be changed or different from the value originally calculated. The offset values may be updated according to another filter where the previous value is changed in a gradual manner to smooth transitions. This may also provide the advantage of filtering out row-dependent noise variations within the column. One mask update process is to set the mask value corresponding to a given pixel, $O_p$, equal to a weighted sum of the previous mask value, $O_{pt-1}$, and the current mask value, $O_{pt}$:

$$O_p = \frac{1}{K}O_{pt} + \frac{K-1}{K}O_{pt-1}$$

where K is an integer. This calculated value, $O_p$, is the value stored at each position $O_{x,y}$ as the kernel is moved through the region of interest.

Thus only one mask value per pixel is stored at any one time, updated as needed by subsequent kernel positions. When the entire region of interest is analyzed, corresponding mask values, $O_{x,y}$ are subtracted from the frame pixel data $P_{x,y}$. This has the effect of suppressing column dependent and row dependent noise variations.

Depending on the configuration of the readout, the methods disclosed may be applied in other orientations, such as by row instead of column.

In an illustrative embodiment, for an array of thousands or more pixels (50 or more pixels on a side) kernel size may be on the order of between 3 and 10 pixels per side, such as m=3, 4 or 5 and n=3, 4 or 5. The number K may also be an integer of 20 or less, such as 16 or 8.

Example Row/Column Filter Method

Figure 5:
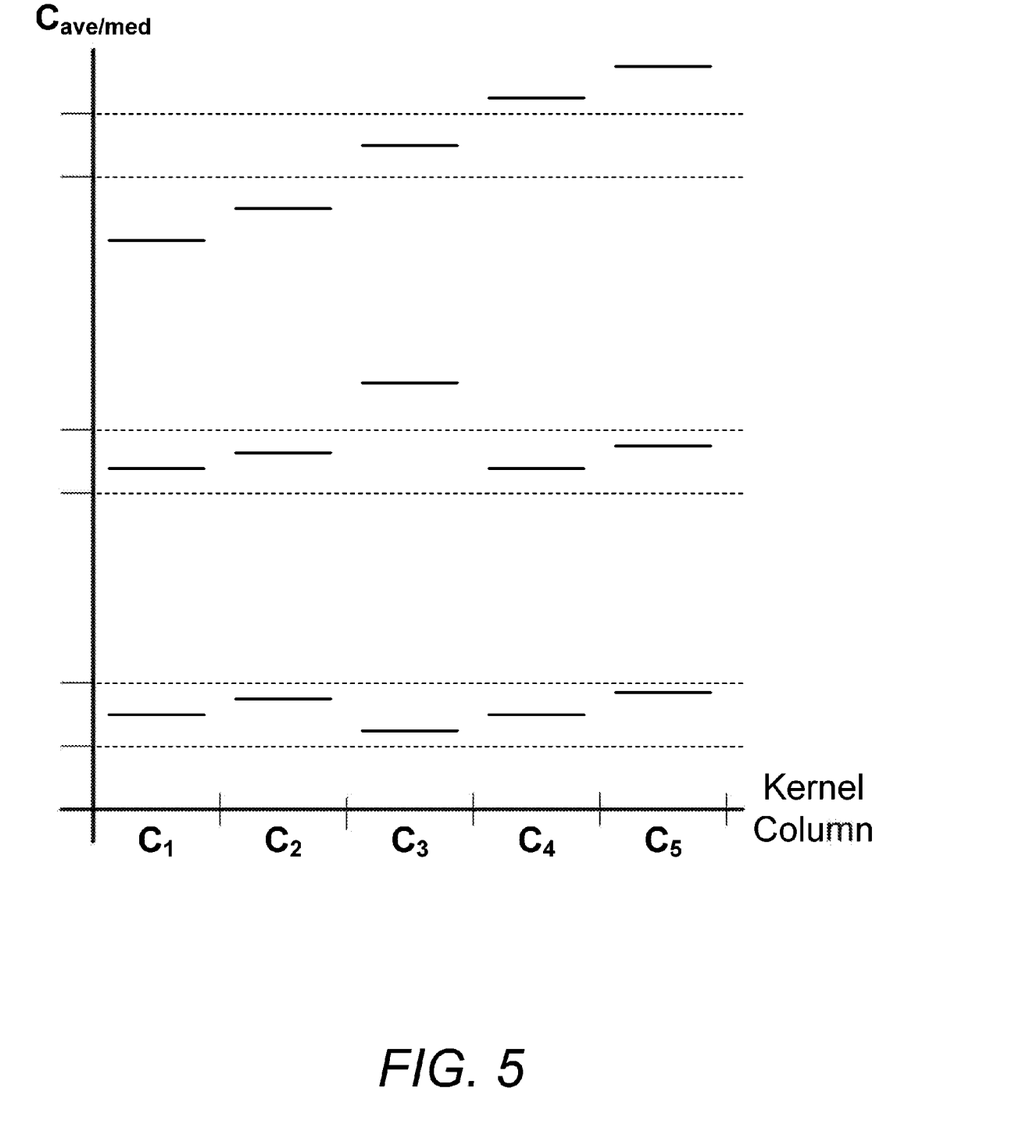
FIG. 5 illustrates gating the column noise filter based at least in part on column pixel values.

FIG. 5 illustrates a flow chart of an example method 300 of determining and applying row/column filter offsets. The method 300 can be performed by the imaging system 100 described herein with reference to FIGS. 1A-1B or an image processing system. Any step of the method 300 can be performed by one or more components of the imaging system 100 (e.g., the filter module 108) and one or more components of the imaging system 100 can perform any step, portion of a step, or combination of steps. For ease of description, the method 300 will be described as being performed by the imaging system, however, it is to be understood that this does not intended to limit the types of systems or devices that can perform the method 300.

Figure 4:
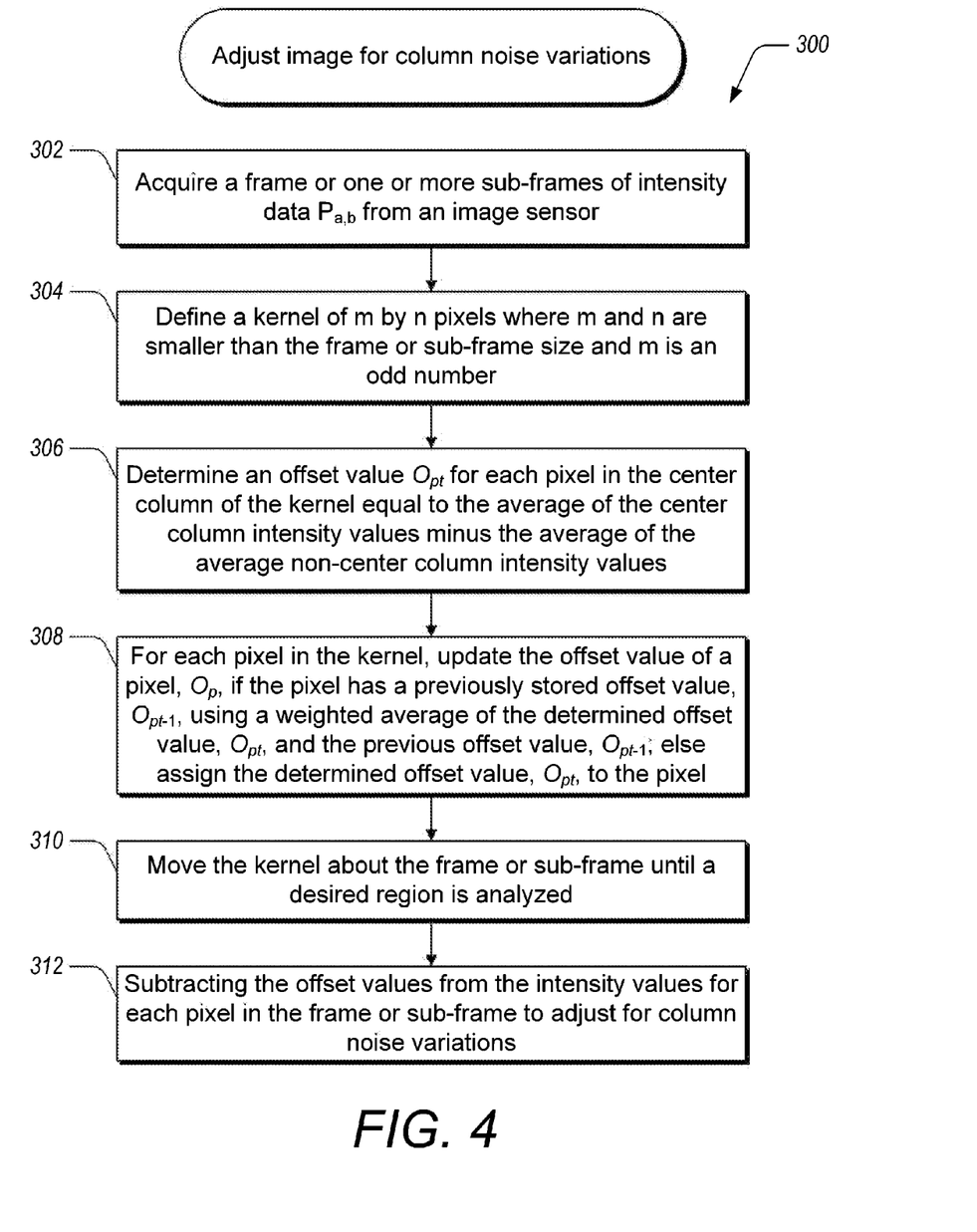
FIG. 4 illustrates a flow chart of an example method for adjusting an image using a column noise filter.

In block 302, the imaging system acquires a frame or one or more sub-frames of intensity data $P_{a,b}$ from an image sensor. As described herein, the frame or sub-frame can comprise a two-dimensional array of pixel values the image sensor. The image sensor can be a thermal image sensor, a focal plane array, or the like. The frame can be a subset of the pixels on the image sensor.

In block 304, the imaging system defines a kernel of m by n pixels where m and n are smaller than the frame or sub-frame size and m is an odd number. For example, the kernel can be defined as an array of pixels where the odd integer m corresponding to one dimension of the array (e.g., the number of columns or the number of rows) is at least 3, at least 5, at least 7, at least 9, and so on. The other dimension, represented by the integer n, can take on any value such as, for example and without limitation, 2, 3, 4, 5, 6, 7, 8, 9, 10, 11, 12, and so on.

In block 306, the imaging system determines an offset value $O_p$ for each pixel in the center column of the kernel. To do so, the imaging system can determine the average or median value of the center column or row of pixels in the kernel. For example, where the kernel is an m by n array and the kernel has an initial coordinate at pixel $P_{a,b}$ (as described with reference to FIG. 3), the average value of the center column of kernel can be calculated as:

$$C_{center} = (P_{(a+m-1)/2,b} + P_{(a+m-1)/2,b+1} + \cdots + P_{(a+m-1)/2,b+n-1})/n$$

The average or median value can be calculated for the other columns as well in a similar manner. The imaging system can then calculate an average or median outer column value. For example, the average outer column value can be calculated as:

$$C_{outer} = \left[\left(\sum_{i=1}^{m} C_i\right) - C_{center}\right] / (m-1)$$

Finally, the imaging system can determine an offset value for each pixel in the center column by determining a difference between the average or median value of the center column of the kernel, $C_{center}$, and the average or median outer column value, $C_{outer}$. For example, the offset value, $O_{pt}$, can be calculated as:

$$O_{pt} = C_{center} - C_{outer}$$

In block 308, the imaging system determines for each of the center column pixels if the pixel already has a stored offset value. If the pixel does not have a previously stored offset value, the imaging system assigns the offset value, $O_{pt}$, to the pixel. For example, where none of the center column pixels have an assigned offset value, the imaging system can assign each center-column pixel offset value, $O_{(a+m-1)/2,j}$, where the index j goes from b to b+n-1, as follows:

$$O_{\frac{a+m-1}{2},b} = O_{pt}$$
$$O_{\frac{a+m-1}{2},b+1} = O_{pt}$$
$$\ldots$$
$$O_{\frac{a+m-1}{2},b+n-1} = O_{pt}$$

If the pixel has a previously stored offset value, $O_{pt-1}$, then the imaging system updates the offset value stored for the pixel. For example, the imaging system can determine an updated offset value for storage, $O_p$, by calculating a weighted average of the previously stored offset value, $O_{pt-1}$, and the currently calculated offset value, $O_{pt}$. An example weighted sum is given by:

$$O_p = \frac{1}{K} O_{pt} + \frac{K-1}{K} O_{pt-1}$$

Thus, the imaging system only stores one offset value for each pixel in the frame or sub-frame using the method 300. The number K can be an integer. The number K can be greater than or equal to 2 and/or less than or equal to 20. The number K can be, for example 8 or 16.

In block 310, the imaging system moves the kernel to a different location within the frame or sub-frame and repeats blocks 306 and 308. This sequence repeats until a desired region is analyzed. The kernel can be moved by one pixel at a time in block 310 or the kernel can move a plurality of pixels each time the kernel is moved. The imaging system can move the kernel a different amount each time it is moved. The imaging system can move the kernel to any location within the frame or sub-frame.

In block 312, the imaging system subtracts the offset values, $O_{x,y}$, from the pixel values from the image sensor, $P_{x,y}$, for each pixel in the frame or sub-frame to adjust for column noise variations. For example, the image sensor can generate intensity values that may be adjusted or corrected using one or more of the modules and/or functionality described herein above with reference to FIG. 1A. These pixel values, $P_{x,y}$, can then be adjusted by subtracting the calculated offset values, $O_{x,y}$, to derive column adjusted image data, $I'_{x,y}$:

$$I'_{x,y} = P_{x,y} - O_{x,y}$$

The row/column noise filter described herein may be used in conjunction with other image processing functions in an image processing chain. Each step in the chain may affect the value of each pixel in the image, thus modifying the actual image data corresponding to the measured intensity. Therefore it may be desirable to only perform an image processing function if the effect targeted by that function is present, and if not leave the pixel in its raw state. The function described herein is intended to depress the effect of systematic row/column noise variations, such as those due to column amplifier noise floor variations, and may alternatively be employed when there is reason to suspect such effects are present.

Referring to FIG. 6, the average (or median) values of each column for a 5-wide kernel (C1 to C5), are plotted. In the lower trace, all of the values are within a small range and thus the variability in the column averages may likely be due to other, smaller noise effects (e.g., not due to column amplifier noise in readout electronics). In the middle trace, the center column C3 is different from its neighbors, lying outside a defined region. This middle ground variation may likely be due to column variation. In the upper trace, there is a large, systematic variation between the columns, which may likely be due to an actual feature in the image such as an edge. Thus, for cases where the variation between the columns is small, it may not be desirable to apply the filter. For an edge feature it may be even more undesirable to apply the filter because it may depress an actual feature of the image. Therefore it may be desirable to add a gating step to the filter that controls whether the row/column noise filter is applied.

The filter acts on the center column of the kernel for each location of the kernel as it is stepped through the region of interest. For the case where the variation among the columns is small, the offset $O_p$ may be small. For the case where there is an edge feature around the center column of the kernel, $O_p$ may also be small due at least in part to the fact that high and low values will average out. Where the center column deviates from its neighbors significantly, $O_p$ may be larger indicating that it is likely due to systematic column variation. Thus, a beneficial aspect of the filter may be to define or select an $O_p$ threshold value above which the filter is applied and otherwise, $O_{x,y}$ will be set to zero for the appropriate pixels, e.g., the filter will not be applied.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for adjusting an image derived from a two-dimensional image sensor of X pixels in one dimension and Y pixels in the other dimension, the method comprising:
   a) acquiring at least one $X_f$ by $Y_f$ frame of image data for a region to be analyzed, P, from the two-dimensional image sensor, where $X_f$ is less than or equal to X and $Y_f$ is less than or equal to Y;
   b) selecting a kernel of image data from the frame starting at a pixel $P_{x,y}$, wherein the kernel comprises an array of m by n pixels where $m<X_f$ and $n<Y_f$, n is greater than or equal to 1, and m is an odd number greater than or equal to 3;
   c) computing at least one of an average or a median of the pixels for each column or row of the kernel;

d) computing at least one of an average or a median of the column averages or medians of all the columns in the kernel except the center column of the kernel;
e) computing a pixel offset value, $O_P$, where the pixel offset value is the difference between the center column average or median and the average or median of the outer column averages or medians, and storing $O_p$ in a corresponding location of an offset mask, $O_{px,y}$, for each pixel in the center column of the kernel, wherein the pixel offset value is computed by an image processing system comprising one or more processors and non-transitory data storage storing computer executable instructions configured to determine a pixel offset mask;
f) moving the kernel by at least one pixel in at least one direction and repeating steps c)-e) for each kernel location, generating a current offset value $O_{pt}$ for pixels affected by the move, wherein the previous value is $O_{pt-1}$ from the previous position of the kernel;
g) updating $O_P$ for each pixel=$(1/K)O_{pt}+((K-1)/K)O_{pt-1}$ until the analyzed region has been stepped through, thus only storing one offset mask value for each pixel at any time;
h) repeating steps f) and g) until at least one of the whole frame or a region of interest of the image frame has been stepped through and analyzed; and
i) subtracting the final offset mask values from the intensity values for the entire frame to adjust for row or column variations from the image data.

2. The method of claim 1, wherein m is 3 and n is 5.
3. The method of claim 1, wherein m is 5 and n is 5.
4. The method of claim 1, wherein K is 8.
5. The method of claim 1, wherein K is 16.
6. The method of claim 1, further comprising setting corresponding offset mask values, $O_{px,y}$, to if the $O_P$ computed for any kernel position is outside a predetermined threshold.
7. A method for adjusting an image derived from data acquired by a two-dimensional image sensor, the method comprising:
  acquiring an image frame from the image sensor, the image frame comprising a two-dimensional array of pixel values with individual pixel values representing image intensity data;
  determining a pixel offset mask comprising an array of offset values, wherein an individual offset value of the pixel offset mask corresponds to an individual pixel in the image frame, wherein the pixel offset mask is determined by an image processing system comprising one or more processors and non-transitory data storage storing computer executable instructions configured to determine a pixel offset mask by executing at least the steps of:
    a) selecting a kernel of image data from the image frame, wherein the kernel is a two-dimensional array of pixels smaller than the image frame, the kernel including at least 3 columns and having an odd number of columns so that the kernel comprises a center column and outer columns, the center column positioned between the outer columns;
    b) determining a column average or column median for individual columns in the kernel equal to an average value or a median value of the pixels in the respective column of the kernel;
    c) calculating an outer column average or outer column median for the kernel equal to an average value or median value of the column averages or column medians for the outer columns;
    d) generating a current offset value for individual pixels in the center column of the kernel, the current offset value equal to a difference between the outer column average or outer column median and the column average or column median of the center column;
    e) if an individual pixel has a previous offset value stored in the offset mask, setting the offset value equal to a weighted sum of the current offset value and the previous offset value, and if the individual pixel does not have a previous offset value stored in the offset mask, setting the offset value equal to the current offset value;
    f) storing the offset value in a corresponding location of the pixel offset mask; and
    g) moving the kernel by at least one pixel in at least one direction and repeating the steps b) through f) for the new location of the kernel; and
  subtracting the pixel offset mask from the corresponding pixel values of the image frame to adjust for column variations in the image intensity data.

8. The method of claim 7, wherein the kernel comprises 3 columns and 5 rows.
9. The method of claim 7, wherein the kernel comprises 5 columns and 5 rows.
10. The method of claim 7, wherein setting an offset value for an individual pixel, $O_p$, equal to a weighted sum of a current offset value, $O_{pt}$, and a previous offset value, $O_{pt-1}$, comprises $$O_p = \frac{1}{K}O_{pt} + \frac{K-1}{K}O_{pt-1}.$$

11. The method of claim 10, wherein the number K is 8.
12. The method of claim 10, wherein the number K is 16.
13. The method of claim 10, wherein the number K is an integer less than or equal to 20.
14. The method of claim 7, further comprising displaying the adjusted image intensity data on a display.
15. The method of claim 7, wherein the image sensor is an infrared focal plane array.
16. An imaging system comprising:
  an image sensor comprising a focal plane array, the image sensor configured to generate electrical signals in response to light incident on the image sensor;
  readout electronics configured to generate digital image data based on the generated electrical signals from the image sensor, the digital image data comprising a two-dimensional array of pixel values forming an image frame;
  an image processing system comprising one or more processors and non-transitory data storage storing computer executable instructions configured to subtract a pixel offset mask from corresponding pixel values of the image frame to adjust for column variations in image data, the image processing system configured to determine the pixel offset mask comprising an array of offset values by executing at least the steps of:
    a) selecting a kernel of image data from the image frame, wherein the kernel is a two-dimensional array of pixels smaller than the image frame, the kernel including at least 3 columns and having an odd number of columns so that the kernel comprises a center column and outer columns, the center column positioned between the outer columns;

b) determining a column average or column median for individual columns in the kernel equal to an average value or a median value of the pixels in the respective column of the kernel;

c) calculating an outer column average or outer column median for the kernel equal to an average value or median value of the column averages or column medians for the outer columns;

d) generating a current offset value for individual pixels in the center column of the kernel, the current offset value equal to a difference between the outer column average or outer column median and the column average or column median of the center column;

e) if an individual pixel has a previous offset value stored in the offset mask, setting the offset value equal to a weighted sum of the current offset value and the previous offset value, and if the individual pixel does not have a previous offset value stored in the offset mask, setting the offset value equal to the current offset value;

f) storing the offset value in a corresponding location of the pixel offset mask; and g) moving the kernel by at least one pixel in at least one direction and repeating the steps b) through f) for the new location of the kernel.

17. The system of claim 16, wherein the image processing system comprises at least one field programmable gate array.

18. The system of claim 16 further comprising an imaging system housing configured to house the image sensor, the readout electronics, and the image processing system.

19. The system of claim 16, wherein the image sensor comprises an array of microbolometers.

20. The system of claim 16 further comprising a display configured to display the adjusted image data.

* * * * *

UNITED STATES PATENT AND TRADEMARK OFFICE
CERTIFICATE OF CORRECTION

PATENT NO. : 9,549,130 B2
APPLICATION NO. : 14/702548
DATED : January 17, 2017
INVENTOR(S) : Jeffrey Lee Page 1 of 1

It is certified that error appears in the above-identified patent and that said Letters Patent is hereby corrected as shown below:

On the Title Page

Item (72) Inventor, change "Jeffery Lee," to --Jeffrey Lee--

In the Specification

In Column 2, Line 51 (Approx.), change "P" to --$P_{a,b}$,--

In Column 3, Line 47 (Approx.), change "r," to --I',--

In Column 3, Line 48 (Approx.), change "image," to --image, $I'_{x,y}$,--

In Column 5, Line 46, change "("ROTC")." to --("ROIC").--

In Column 5, Line 48, change "ROTC" to --ROIC--

In Column 15, Line 16-17 (Approx.), change
"$C_{center} = (P_{(a+m-1)/2,b} + P_{(a+m-1)/2,b+1} +... +P_{(a+m-1)/2,b+n-1}) / n$" to
--$C_{center} = (P_{(a+m-1)/2,b} + P_{(a+m-1)/2,b+1} +... +P_{(a+m-1)/2,b+n-1}) / n$--

Signed and Sealed this
Twenty-third Day of October, 2018

Andrei Iancu
*Director of the United States Patent and Trademark Office*